United States Patent [19]

Matsuyama et al.

[11] 4,396,527

[45] Aug. 2, 1983

[54] AQUEOUS EMULSIONS OF ORGANIC PEROXIDES

[75] Inventors: Kazuo Matsuyama, Gamagori; Nobuyuki Satomi, Aichi; Takeshi Arai, Aichi; Takashi Yamamoto, Aichi, all of Japan

[73] Assignee: Nippon Oil and Fats Co., Ltd., Tokyo, Japan

[21] Appl. No.: 283,847

[22] Filed: Jul. 16, 1981

[30] Foreign Application Priority Data

Jul. 25, 1980 [JP] Japan .................................. 55-101295

[51] Int. Cl.$^3$ ................................................ A01N 3/00
[52] U.S. Cl. .......................... 252/186.23; 252/186.26; 252/186.42; 252/312; 526/202; 526/210; 526/212; 526/216; 524/458; 524/459

[58] Field of Search .............. 252/186.42, 312, 186.23, 252/186.26; 526/212, 216, 210, 344.2, 225, 202; 524/458, 459, 457

[56] References Cited

U.S. PATENT DOCUMENTS 4,133,791   1/1979   Kemenater .......................... 524/459

FOREIGN PATENT DOCUMENTS 1111826   7/1961   Fed. Rep. of Germany ...... 526/208

*Primary Examiner*—Josephine Barr
*Attorney, Agent, or Firm*—Flynn, Thiel, Boutell & Tanis

[57] ABSTRACT

An aqueous emsulion of organic peroxide which is obtained by incorporating a water soluble alcohol of low molecular weight into a system which comprises an organic peroxide, an emulsifier and water, is good in the storage stability and it is capable of being transported at a low temperature.

10 Claims, No Drawings

AQUEOUS EMULSIONS OF ORGANIC PEROXIDES

BACKGROUND OF THE INVENTION

This invention relates to aqueous emulsions of organic peroxides and more particularly to aqueous emulsions of organic peroxides which are excellent in stability and safety and which are capable of being stored and transported at a low temperature and also capable of being transported by means of a pump.

DESCRIPTION OF THE PRIOR ART

Homopolymerization of vinyl halides such as vinyl chloride, vinyl bromide and vinyl fluoride or copolymerization of the vinyl halides with vinylidene halides such as vinylidene chloride and vinylidene fluoride or with vinyl type monomers having a terminal $CH_2=C<$ group such as ethylene, propylene and vinyl acetate has been carried out in general by a suspension—or emulsion—polymerization process.

In these polymerization processes, the procedure is adopted in which a monomer or a mixture of monomers to be polymerized is dispersed in water in the presence of a dispersing agent and then a radical polymerization initiator for initiating the polymerization is incorporated.

Recently, it has been highly desired to shorten the polymerization time per batch in order to improve the producibility of the obtained polymers. For this purpose, radical polymerization initiators which are highly reactive at a low temperature are used.

Such radical polymerization initiators mainly include organic peroxides such as peroxydicarbonates, peroxyesters and diacyl peroxides. Highly purified products of these compounds are used as a solution thereof in a hydrocarbon such as mineral spirit, hexane, cyclohexane or toluene, which is a solvent in which the organic peroxides are soluble, because the peroxides have very high reactivity and are so unstable that there is a hazard of explosion.

The solution is stored and transported in a safe form at a temperature below room temperature.

However, the solution which is obtained by diluting the organic peroxide with the oil soluble solvent may cause a phase-separation which results in the occurrence of a highly dangerous enriched portion of the organic peroxide. In addition, the solution may involve a danger of fire, since there is used an inflammable solvent and it is expensive since the solvent is costly.

Further, the solvent takes part in the polymerization reaction system, thereby a part of the solvent frequently remains in the final product polymer to cause some troubles in the practical use of the polymer. For example there are problems in food hygiene and those in relation with the safety in the polymerization or the processing of the polymer.

Attempts have been made for avoiding the use of an organic peroxide diluted with the oil soluble solvent, by using the organic peroxide emulsified in water. For example, a polymerization initiator which is prepared by emulsifying the organic peroxide in an aqueous solution containing 1–10% by weight of polyvinyl alcohol and 1–6% by weight of polyoxyethylene sorbitanmonolaurate is used in a process for homopolymerizing vinyl chloride or copolymerizing vinyl chloride with a vinylidene halide as disclosed in Japanese Patent Laid-Open Publication No. 130,885/1975.

A frozen organic peroxide emulsion comprising 30–70% by weight of the organic peroxide, an effective amount of emulsifier such as of polyvinyl alcohol and residual water is described in Japanese Patent Laid-Open Publication No. 14,714/1977.

However, these organic peroxide emulsions are extremely less advantageous in economy, since they become frozen when cooled to the temperature of or lower than the freezing point of water and a defrosting step is needed when used.

A defrosted organic peroxide emulsion is decreased in stability and even possibly shows phase separation.

It is not practical for the purpose of lowering the freezing point, to use an increased amount of the emulsifier such as polyvinylalcohol, which is described in the above mentioned patent publication, since the substance has a low solubility in water and gives little depression in freezing point.

On the other hand, water-soluble alcohols of low molecular weight have hitherto been considered to be unfavorable solvents as they extremely reduce the storage stability of the organic peroxide.

For example, the half-life of di-(isopropyl)peroxydicarbonate in various solvents in a concentration ranging from 5 to 50% is given in Industrial and Engineering Chemistry, 56 (12), 33 (1964) authored by W. A. Strong. It is shown that though the values of the half-life are in the range of from 0.78 to 15 days at 25° C. in almost all solvents, the compound exceptionally becomes very unstable in isopropyl alcohol which is to a water-soluble alcohol of low molecular weight, and a vigorous decomposition takes place 25 minutes after it was dissolved.

As seen above, it is a generally recognized phenomenon that water-soluble alcohols remarkably promote the decomposition of the organic peroxides.

The polymerization intiator can produce a large amount of polymers by the use of a very small amount of the initiator in a polymerization process and therefore, a little decrease in the concentration due to the decomposition of an organic peroxide may cause a large reduction of the yield of the polymers, thereby resulting in a large economic damage. Furthermore, decomposition products of the organic peroxide are unfavorable substances in the polymerization process in most cases and there may be cases in which the decomposition products considerably affect the polymerization rate and resulting polymers. It is extremely important, in using the organic peroxides as polymerization initiators, that the organic peroxides do not decompose during storage.

SUMMARY OF THE INVENTION

This invention is to provide aqueous emulsions of organic peroxides which are capable of being transported and stored at low temperature and further capable of being transported by a pumping step as well as being excellent in stability and safety.

Another object of this invention is to provide aqueous emulsions of organic peroxides which do not require a defrosting step after cooling and are stable against rapid change of the atmospheric temperature or fine vibrations.

A further object of this invention is to provide aqueous emulsions of organic peroxides which can be used as a polymerization initiator in the polymerization of an ethylenically unsaturated monomer to produce a polymer of excellent quality. This invention is based on the findings in that although a water soluble alcohol of low molecular weight has been considered to be an unfavorable solvent which remarkably reduces the storage stability of organic peroxides, the storage stability of the organic peroxide is improved when the water soluble alcohol of low molecular weight is allowed to exist in the organic peroxide emulsified in water and that the resulting aqueous emulsions of organic peroxides hardly freeze.

The aqueous emulsion of organic peroxide (hereinafter referred to as PO emulsion) of the present invention is prepared by incorporating at least one water soluble alcohol having a molecular weight of less than 100 as an antifreezing agent into a system comprising at least one organic peroxide having a freezing point of less than 0° C. and having a 10 hrs half life temperature of less than 75° C., an emulsifier and water.

The preparation of the PO emulsion of this invention can be carried out by a process in which to a solution obtained by dissolving in water an emulsifier and water-soluble alcohol having a molecular weight of less than 100, is added into the organic peroxide under stirring, or in that the organic peroxide is added into the above mentioned solution. In the preparation, the emulsifier can be also used by dissolving it into the organic peroxide. Thus prepared PO emulsion contains water as a continuous phase.

Organic peroxides used in this invention are one or a mixture of more than one organic peroxide whose 10 hr half life temperature is not more than 75° C. and whose freezing point is not higher than 0° C. This invention includes the use of a mixture of an organic peroxide having a freezing point of not higher than 0° C. with one having a freezing point of not lower than 0° C., which mixture shows, as a result, a freezing point of not higher than 0° C. The 10 hours half-life temperature of an organic peroxide means herein the temperature at which the organic peroxide decomposes to have one-half of the originally existing active oxygen content after 10 hours, when the organic peroxide is diluted mainly with a solvent which is relatively inactive to the organic peroxide, such as benzene or toluene, to give the concentration ranging from about 0.1 to 0.2 mole/l and is maintained at the temperature.

Examples of the above mentioned organic peroxides are peroxydicarbonates such as di-(n-propyl)peroxydicarbonate, di-(isopropyl)peroxydicarbonate, di-(sec-butyl)peroxydicarbonate di-(capryl)peroxydicarbonate, di-(2-ethylhexyl)peroxydicarbonate, di-(2-ethoxyethyl)-peroxydicarbonate and di-(methoxyisopropyl)peroxydicarbonate; peroxyesters such as t-butyl peroxypivalate, t-butyl peroxyisobutyrate, t-butyl peroxy-3,5,5-trimethylhexanoate, and t-butyl peroxy-2-ethylhexanoate; and di-acyl peroxides such as di-propionyl peroxide, di-isobutyryl peroxide and di-(3,5,5-trimethylhexanoyl)peroxide.

An example of mixtures of organic peroxides is a mixture of di-(2-ethylhexyl)peroxydicarbonate and acetylcyclohexyl sulfonyl peroxide.

It is more preferable to use, among the above mentioned organic peroxides, one having a particularly hydrophobic substitution group for obtaining a more stable PO emulsion.

A solvent can be incorporated in this invention in order to stabilize the above mentioned organic peroxide or for the purpose of lowering the freezing point.

The content of the above mentioned organic peroxide in the PO emulsion of this invention is usually 5–80% by weight and preferably 10–65% by weight, since a lower content thereof results in a high transportation cost which is economically unfavorable and a higher content thereof tends to prevent preparation of a product which is excellent in stability.

The residual components are water, an emulsifier and a water-soluble alcohol having a molecular weight of not more than 100.

The water soluble alcohol having a molecular weight of less than 100 which is used in this invention, means a low molecular weight alcohol capable of being dissolved in water in any proportion, for example, methanol, ethanol, n-propanol, isopropanol, ethyleneglycol and the like.

The use of the alcohol in a very low amount hardly effects a sufficient freezing point depression but the use of an excessive amount results in increasing decomposition of the organic peroxide.

Accordingly, it is preferable to use the alcohol in an amount ranging from 0.02 to 7 parts by weight based on one part by weight of the water.

The above mentioned water soluble alcohols may be used in combinations of two or more than two of said alcohols.

As the emulsifier, substances which are known to usually exert surface activity, such as anionic surfactants, cationic surfactants, nonionic surfactants, amphoteric surfactants, and high molecular surfactants and protective colloid agents can be exemplified.

As the surface active agents which are preferably incorporated in the PO emulsion for producing vinyl polymers excellent in quality, sorbitan mono-, di- and triesters of lauric acid, palmitic acid, stearic acid or oleic acid and saccharose mono-, di-, and triesters of lauric acid, palmitic acid, stearic acid or oleic acid are exemplified, among the above mentioned surface active agents. As the protective colloid agents for example, water soluble synthetic or naturally occurring high molecular compounds such as polyvinyl alcohol, partly acetylated polyvinyl alcohols and cellulose derivatives are listed.

Emulsification of the organic peroxide can be carried out by using one or more than one suitable emulsifiers selected from the above ones.

In view of the considerations of economy and possible unfavorable effects, it is preferable to use the emulsifier in at least an amount effective to obtain a stable PO emulsion and the used amount thereof is usually in a range of 0.001 to 0.5 part by weight based on one part by weight of water used.

When the emulsifier is dissolved in water or the organic peroxide, it may be usually difficult to carry out the dissolution but the use of the water soluble alcohol together with the others can improve the solubility.

A conventional apparatus can be used for producing the PO emulsion of this invention. Examples are ones providing with mechanically rotatable stirrers of the paddle-, propeller- or turbine-type. A colloid mill, a homogenizer, a high speed shearing emulsifier, an ultrasonic homogenizer and the like can be used for this purpose.

The PO emulsions of this invention have some advantageous characteristics as shown below.

First, conventional cooling processes can be applied on the PO emulsion without any effect on the emulsion when it is necessary to store it at a low temperature and no defrosting step is necessary before it is used as the polymerization catalyst.

Second, as the organic peroxide and the water can be emulsified in a good state, the emulsion is excellent in stability and thus the storage, handling and transportation of the emulsion can be carried out in a very safe way, because vigorous decomposition and self-promoting and violent combustion on firing, as are seen in conventional radical polymerization initiators, are prevented. Especially, as the water soluble alcohol of low molecular weight, which is usually of low density, is contained in the emulsion, it is possible to prepare it in such a manner that the aqueous phase forms an upper part when phase separation of the PO emulsion happens. As a result it is possible to produce PO emulsions which are much more excellent in safety. In addition, the PO emulsion of this invention is stable against a rapid change of the atmospheric temperature or fine vibrations.

Third, such PO emulsions are liquid with low viscosity and can be easily diluted with water. Therefore, they are suited for the transportation and the measurement of PO emulsion by means of pumping. Further, the leaks of the PO emulsion can be easily washed off.

A representative use of the PO emulsion of this invention is the production of polymers from ethylenically unsaturated monomers and it is especially adequate for the suspension polymerization of such vinyl monomers as the vinyl halide series.

According to the process of the suspension polymerization of this invention, a vinyl polymer excellent in quality is produced, for example, by charging water, dispersing agent and the above mentioned monomer, then introducing the PO emulsion and conducting procedures of stirring and heating to polymerize.

The charging of the PO emulsion can be carried out by pumping transportation after the PO emulsion is diluted with water to give a proper viscosity and/or by charging it after another radical polymerization initiator is previously admixed in the PO emulsion. At the time, breakage of the emulsion can be prevented by selecting the species and the amount of the emulsifier.

Polymers produced by using the PO emulsion of this invention are excellent in quality as compared with ones prepared by conventional processes since the additives, such as the emulsifier and the alcohol, are removed with water.

This invention is further illustrated by way of Examples and Comparative Tests, which are for the purpose of illustration but not for restricting this invention only to the Examples.

In the description, the terms parts and % refer to parts by weight and % by weight except as otherwise stated.

EXAMPLE 1

Into a three neck flask of 500 ml capacity which was provided with a usual stirring device and a thermometer, there were charged 40 parts of di-(2-ethylhexyl)-peroxydicarbonate having a freezing point of not more than $-50°$ C. and having a 10 hrs half life temperature 43.5° C.

The content of the flask was heated to 20° C., wherein there was added dropwise under stirring an aqueous mixture solution consisting of 43 parts of water, 12 parts of methanol, 2 parts of polyvinyl alcohol, 1.5 parts of sorbitan monolaurate (trade mark; Nonion LP-20R prepared by Nippon Oil and Fats Co., Ltd.) and 1.5 parts of sorbitan monooleate (Nonion OP-80R, Trade Mark, produced by Nippon Oil and Fats Co., Ltd.). After the addition, the stirring was continued for 20 minutes, whereby a homogeneous and stable milky PO emulsion having a viscosity of 1.3 poises at 21° C. was obtained.

Stability tests and safety tests were carried out as mentioned below using this PO emulsion. Results are listed in Table 1.

[Stability Tests (Storage Stability Tests)]

Samples were taken into vessels maintained at $-15°$ C. or 30° C. respectively. After maintaining the samples for predetermined times at the temperature, the contents of the organic peroxides in the samples were determined. The storage stability of the samples were measured with the decrease in content of the organic peroxide and the change in appearance of the samples.

The storage stability was estimated by classifying the results by the following symbols:
⊙ symbol shows that no change was observed during 1-30 days;
○ symbol shows that not less than 50% of the organic peroxide was decomposed in 6-24 hours;
Δ symbol shows that not less than 50% of the organic peroxide was decomposed in 1-6 hours.
× symbol shows that the sample was coagulated within 1 hour. Safety Tests Combustion Test Combustion tests were carried out using a Cleveland open-type flash tester as shown in Japanese Industrial Standard-K2274-62 to determine the flash points of the samples. Combustion state was also observed. The results of the combustion tests were classified by the following symbols;
⊙ symbol shows that the flash point was not less than 70° C. and the combustion state was mild;
○ symbol shows that the flash point was within the range of 66°-70° C. and the combustion state was relatively intense;
Δ symbol shows that the flash point was within the range of 62°-66° C. and the combustin state was considerably intense;
× symbol shows that the flash point was not more that 62° C. and the combustion state was extremely intense;

Rapid Heating Test

According to the Rapid Heating Test process prescribed by O.P.P.S.D. (abbreviation of the Organic Peroxide Producer Safety Division), the heat stability of each sample was estimated to measure the temperatures at which the decomposition takes place and the maximum reaching temperatures. The results of heat stability by the rapid heating test were classified by the following symbols;
⊙ symbol shows that the maximum reaching temperature was not higher than 100° C.;
○ symbol shows that the maximum reaching temperature was from more than 100° C. to 130° C.
Δ symbol shows that the maximum reaching temperature was from more than 130° C. to 160° C.
× symbol shows that the maximum reaching temperature was more than 160° C.

COMPARATIVE TEST 1

Into a flask of 500 ml capacity which was provided with a usual stirring device, there were charged 40 parts of di-(2-ethylhexyl)peroxydicarbonate and 60 parts of toluene and sufficiently stirred to give a homogeneous solution.

COMPARATIVE TEST 2

A homogeneous solution was prepared according to the same procedures as those in Comparative Test 1 except for changing toluene used as diluent to methanol.

COMPARATIVE TEST 3

According to the same procedures as shown in Example 1 except for using 40 parts of di-(2-ethylhexyl)peroxydicarbonate, 3 parts of polyvinyl alcohol, 4 parts of polyoxyethylene sorbitan monolaurate and 53 parts of water, a PO emulsion which is one of the compositions described in Japanese Patent Laid-Open Publication No. 130885/1975, was prepared.

Then, the stability test and the safety test were carried out in the same manner as shown in Example 1 using the samples prepared in Comparative Tests 1 to 3. The results are shown in Table 1.

TABLE 1

| Test | | Sample Example 1 | Comparative Tests 1 | 2 | 3 |
|---|---|---|---|---|---|
| Storage Stability Test | −15° C. | ⊚ | ⊚ | ⊚ | x |
| | 30° C. | ○ | ○ | Δ | ○ |
| Safety Test | Combustion Test | ⊚ | x | x | ⊚ |
| | Rapid Heat Test | ⊚ | Δ | Δ | ⊚ |

From Table 1, it was recognized that the PO emulsion of Example 1 was superior to that of comparative Test 1 which was a toluene-dilution product in the safety test and that the former PO emulsion was superior to a methanol-diluted product of Comparative Test 2 not only in the safety test but also in the storage stability test. Further, it was also recognized that the PO emulsion of Example 1 was superior to in the storage test to the PO emulsion of Comparative Test 3 which was one disclosed in Japanese Patent Laid-Open Publication No. 130885/1975.

EXAMPLE 2-4

PO emulsions containing di-(2-ethylhexyl)peroxydicarbonate in amounts of 20% (Example 2), 60% (Example 3) and 80% (Example 4) respectively were prepared according to the same procedures as those in Example 1 except for using the peroxydicarbonate in amounts of 15 parts in Example 2, 90 parts in Example 3 and 240 parts in Example 4. A homogeneous milky PO emulsion was obtained in each Example.

Viscosity values of these emulsions at 20° C. were 1.0 poise in Example 2, 5.9 poises in Example 3 and 15 poises in Example 4, respectively.

COMPARATIVE TEST 4

A PO emulsion containing di-(2-ethylhexyl)peroxydicarbonate in an amount of 60% was produced in the same manner as in Comparative Test 3 except for using the peroxydicarbonate in an amount of 90 parts.

COMPARATIVE TEST 5

A homogeneous solution containing di-(2-ethylhexyl)peroxydicarbonate in the concentration of 60% was prepared in the same manner as in Comparative Test 1 except for using the peroxydicarbonate in an amount of 90 parts.

The storage stability test at −15° C. and the safety test for samples obtained in Examples 2-4 and Comparative Tests 4 and 5 were carried out in the same manner as shown in Example 1.

The results are shown in Table 2.

TABLE 2

| Test | | Sample Examples 2 | 3 | 4 | Comparative Test 4 | 5 |
|---|---|---|---|---|---|---|
| Storage Stability Test (−15° C.) | | ⊚ | ⊚ | | x | ⊚ |
| Safety Test | Combustion Test | ⊚ | | Δ | ○ | x |
| | Rapid Heat Test | ⊚ | | Δ | ○ | x |

From Table 2, it was recognized that the PO emulsion of Example 3 was superior in the safety test to toluene-diluted product of Comparative Test 5 which contained the peroxydicarbonate in the same amount of 60% and that the PO emulsion was superior in the storage stability test to that of Comparative Test 4, which is disclosed in Japanese Patent Laid Open Publication No. 130885/1975.

EXAMPLE 5

A PO emulsion was prepared in the same manner as shown in Example 1 except for using t-butylperoxy-2-ethylhexanoate having a freezing point of not more than −30° C. and a 10 hrs half-life temperature of 72.5° C. instead of di-(2-ethylhexyl)peroxydicarbonate and also using 3% of sorbitan monopalmitate (Nonion PP-40 R, manufactured by Nippon Oil and Fats Co., Ltd.) instead of sorbitan monolaurate and sorbitan monooleate and further except for adding dropwise the above mentioned t-butylperoxyoctoate into the aqueous mixture solution. Then, a homogeneous milky PO emulsion having viscosity value of 1.1 poises at 20° C. was obtained.

EXAMPLE 6

A PO emulsion was produced in the same manners as in Example 1 except for using ethylene glycol instead of methanol in Example 1. A homogeneous PO emulsion whose viscosity value was 1.2 poises at 20° C., was obtained.

EXAMPLE 7

According to the same procedures as shown in Example 1, a PO emulsion was prepared, except for using 0.4 parts of saccharose monolaurate (trade mark: Ryoto Sugar Ester. S-1670 produced by Ryoto Sugar Manufacturing Co., Ltd.) and 2.6 parts of sorbitan mono oleate instead of sorbitan monolaurate and sorbitan monooleate, whereby a white milky PO emulsion whose viscosity was 1.4 poises at 20° C., was obtained.

EXAMPLE 8

According to the same procedures as shown in Example 1, a PO emulsion was prepared except for using di(3,5,5-trimethyl)hexanoyl peroxide whose freezing point is less than −70° C. and whose 10 hrs half life temperature is 59.5° C., instead of di(2-ethylhexyl)-peroxydicarbonate and for using 6 parts of methyl alcohol and 6 parts of ethyleneglycol instead of methyl alcohol and for dropping the said di(3,5,5-trimethyl)-hexanoylperoxide into the mixed aqueous solution, thereby obtaining a white milky emulsion whose viscosity was 1.3 poises at 20° C. and which was uniform, was obtained.

Respective samples were taken from the PO emulsions which were obtained in Examples 5–8.

Each sample was applied to the same stability test and safety test. It was found that the safety and stability of each sample was similar to Example 1.

REFERENCE EXAMPLE 1 (Polymerization of vinyl chloride)

There were charged 0.45 part of polyvinyl alcohol, 300 parts of water, 100 parts of vinyl chloride and 0.075 part of the PO emulsion which was obtained by Example 1, into an autoclave.

After the autoclave was evacuated, the content of the autoclave was heated up to 58° C., while stirring and the reaction was continued for 8 hours until the reaction was completed, thereby obtaining white powders of polyvinyl chloride with yield of 85%.

It was found that the thus obtained polymers had splendid heat stability and electric stability without getting a harmful effect from methanol and emulsifier which were contained in the P.O. emulsion. The polymer was easy for drying because it did not contain oil soluble solvent in polymerization.

The embodiments of the invention in which an exclusive property or privilege is claimed are defined as follows:

1. An aqueous emulsion of an organic peroxide component wherein said organic peroxide component is emulsified in water with the water being the continuous phase, said aqueous emulsion consisting essentially of:
   (A) from 5 to 80% by weight of an organic peroxide component, said organic peroxide component consisting of one or a mixture of two or more organic peroxides selected from the group consisting of peroxydicarbonates, peroxyesters and diacylperoxides, said organic peroxide component having a freezing point of less than 0° C. and having a 10 hour half-life temperature of less than 75° C., wherein the 10 hour half-life temperature is the temperature at which said organic peroxide component decomposes, in a time period of 10 hours, to have an active oxygen content of one-half the active oxygen content that it had at the beginning of said 10 hour time period when said organic peroxide component is diluted with an inactive solvent so as to have a concentration of about 0.1 to 0.2 mole/liter and is maintained at that temperature;
   (B) from 0.02 to 7 parts by weight, per one part by weight of said water, of one or a mixture of two or more water-soluble alcohols having molecular weights of less than 100 and which are capable of being dissolved in water in any proportion;
   (C) from 0.001 to 0.5 part by weight, per one part by weight of said water, of an emulsifier component consisting of a surface active agent and a water-soluble protective colloid, said surface active agent being selected from the group consisting of sorbitan and saccharose mono-, di- and tri-esters of lauric acid, palmitic acid, stearic acid and oleic acid, and mixtures of said esters, and
   (D) the balance is essentially said water.

2. An aqueous emulsion as claimed in claim 1 wherein said organic peroxide component is selected from the group consisting of di(n-propyl)peroxydicarbonate, di(isopropyl)peroxydicarbonate, di(sec-butyl)peroxydicarbonate, di(capryl)peroxydicarbonate, di(2-ethylhexyl)peroxydicarbonate, di(2-ethoxyethyl)peroxydicarbonate and di(methoxyisopropyl)peroxydicarbonate.

3. An aqueous emulsion as claimed in claim 1 wherein said organic peroxide component is selected from the group consisting of t-butyl peroxypivalate, t-butyl peroxyisobutyrate, t-butyl peroxy-3,5,5,-trimethylhexanoate and t-butyl peroxy-2-ethylhexanoate.

4. An aqueous emulsion as claimed in claim 1 wherein said organic peroxide component is selected from the group consisting of dipropionyl peroxide, diisobutyryl peroxide and di(3,5,5-trimethylhexanoyl)peroxide.

5. An aqueous emulsion as claimed in claim 1 wherein said organic peroxide is di(2-ethylhexyl)peroxydicarbonate.

6. An aqueous emulsion as claimed in claim 1 wherein said organic peroxide component is t-butyl peroxy-2-ethylhexanoate.

7. An aqueous emulsion as claimed in claim 1 wherein said organic peroxide is di(3,5,5-trimethylhexanoyl)peroxide.

8. An aqueous emulsion as claimed in claim 1 wherein said water-soluble alcohol is methanol.

9. An aqueous emulsion according to claim 1, wherein said water-soluble alcohol is one or more compounds selected from the group consisting of methyl alcohol, ethyl alcohol, n-propyl alcohol, isopropyl alcohol and ethylene glycol.

10. An aqueous emulsion as claimed in claim 1 in which the amount of said organic peroxide component is from 10 to 65% by weight.

* * * * *